(12) United States Patent
Hagedorn et al.

(10) Patent No.: US 10,245,983 B1
(45) Date of Patent: Apr. 2, 2019

(54) OFF-ROAD PERFORMANCE SEAT

(71) Applicant: Ford Global Technologies, LLC, Dearborn, MI (US)

(72) Inventors: Gregory Hagedorn, Bloomfield Hills, MI (US); Jimmy Moua, Canton, MI (US); Timothy Owen Hamlin, Warren, MI (US); Adam Ewel, Royal Oak, MI (US); Johnathan Andrew Line, Northville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/711,702

(22) Filed: Sep. 21, 2017

(51) Int. Cl.

| B32B 3/26 | (2006.01) |
|---|---|
| B32B 5/18 | (2006.01) |
| B60N 2/38 | (2006.01) |
| B60N 2/58 | (2006.01) |
| B60N 2/68 | (2006.01) |
| B32B 27/06 | (2006.01) |
| B32B 27/08 | (2006.01) |
| B32B 27/30 | (2006.01) |
| B32B 27/32 | (2006.01) |

(52) U.S. Cl.
CPC ............... *B60N 2/38* (2013.01); *B32B 3/266* (2013.01); *B32B 5/18* (2013.01); *B32B 27/065* (2013.01); *B32B 27/08* (2013.01); *B32B 27/306* (2013.01); *B32B 27/32* (2013.01); *B60N 2/58* (2013.01); *B60N 2/68* (2013.01); *B32B 2307/724* (2013.01); *B32B 2307/7265* (2013.01)

(58) Field of Classification Search
CPC .... B60N 2/38; B60N 2/68; B60N 2/58; B32B 27/065; B32B 27/306; B32B 27/32; B32B 27/08; B32B 3/266; B32B 5/18; B32B 2307/7265; B32B 2307/724
USPC ..................................... 297/452.46, DIG. 1
See application file for complete search history.

(56) References Cited

U.S. PATENT DOCUMENTS

| 3,895,841 | A | * | 7/1975 | Lebert | B60K 25/00 |
|---|---|---|---|---|---|
| | | | | | 297/216.1 |
| 5,165,754 | A | | 11/1992 | Louys | |
| 5,927,817 | A | | 7/1999 | Ekman et al. | |
| 5,944,380 | A | | 8/1999 | Atherley | |
| 6,626,488 | B2 | | 9/2003 | Pfahler | |
| 6,655,735 | B1 | * | 12/2003 | Learning | A47C 31/113 |
| | | | | | 297/228.1 |

(Continued)

FOREIGN PATENT DOCUMENTS

| CN | 201931658 U | * | 8/2011 |
|---|---|---|---|
| EP | 2179888 A2 | | 4/2010 |

*Primary Examiner* — Milton Nelson, Jr.
(74) *Attorney, Agent, or Firm* — Vichit Chea; Price Heneveld LLP

(57) ABSTRACT

A seat assembly includes a frame assembly have a seat portion and a seatback portion, wherein a seat member is supported on the seat portion of the frame assembly and a seatback is supported on the seatback portion of the frame assembly. Each of the seatback and the seat include a support portion supported on a carrier member, wherein the support portion and the carrier member are comprised of porous non-absorbent materials that are configured to allow water to drain therethrough. A cover member is comprised of a perforated fabric that is non-absorbent, and includes a first portion covering the seat member and a second portion covering the seatback.

12 Claims, 5 Drawing Sheets

(56) References Cited

U.S. PATENT DOCUMENTS

| | | | |
|---|---|---|---|
| 7,108,319 B2* | 9/2006 | Hartwich | B60N 2/56 297/180.1 |
| 8,991,930 B2 | 3/2015 | Laframboise et al. | |
| 9,125,493 B2 | 9/2015 | Siekman et al. | |
| 2007/0020447 A1* | 1/2007 | Yamaguchi | B60R 13/08 428/304.4 |
| 2009/0066142 A1 | 3/2009 | Ventura et al. | |
| 2012/0171269 A1 | 7/2012 | Kostak | |
| 2013/0140857 A1* | 6/2013 | Shin | B60N 2/5657 297/180.13 |
| 2013/0193738 A1* | 8/2013 | Siekman | A47C 7/021 297/452.56 |
| 2016/0318428 A1* | 11/2016 | Hugues | B60N 2/90 |

* cited by examiner

OFF-ROAD PERFORMANCE SEAT

FIELD OF THE INVENTION

The present invention generally relates to a vehicle seating assembly, and more particularly, to a seat assembly configured for use in off-road vehicles, wherein the seat assembly includes a number of features that provide improved suspension and water control for off-roading.

BACKGROUND OF THE INVENTION

In off-road vehicles, seat assemblies are often subjected to various elements, such as debris and water, which can deteriorate the seat assembly over time. Water resistant seating materials that are currently employed to combat these elements lack airflow and usually lose their water resistance when the surface is damaged due to the support materials of the seat assembly being comprised of foam structures that can still absorb water and begin to mold, smell and deteriorate over time. Also, water resistant seating found in the aftermarket is not legal for to use on public roads due to a lack of integration with a vehicle's safety systems. Standard seat assemblies do not drain water at all, and do not provide enough suspension to prevent injury from large bumps while off-roading. A seat assembly is desired having sufficient drainage capabilities and non-absorbent materials to combat water exposure and having sufficient suspension features for off-roading capabilities.

SUMMARY OF THE INVENTION

According to one aspect of the present invention, a seat assembly includes a carrier member having upper and lower sides interconnected by a plurality of drainage apertures. A support portion is supported on the upper side of the carrier member and is comprised of a closed-cell foam material. A cover member is disposed over an upper surface of the support portion and is comprised of a perforated fabric.

Embodiments of the first aspect of the invention can include any one or a combination of the following features:
  wherein the carrier member is comprised of a perforated polymeric material.
  wherein the carrier member is water resistant.
  wherein the support portion is water resistant.
  wherein the cover member is water resistant.
  wherein the polymeric material includes an expanded polypropylene material.
  wherein the closed-cell foam material is comprised of ethylene-vinyl acetate.

According to another aspect of the present invention, a seat assembly includes a frame assembly have a seat portion and a seatback portion. A seat member is supported on the seat portion of the frame assembly and a support portion is supported on a carrier member. The support portion and the carrier member of the seat member are comprised of porous non-absorbent materials that are configured to allow water to drain therethrough. A seatback is supported on the seatback portion of the frame assembly and includes a support portion supported on a carrier member. The support portion and the carrier member of the seatback are comprised of porous non-absorbent materials that are configured to allow water to drain therethrough. A cover member is comprised of a perforated fabric that is non-absorbent. The cover member includes a first portion covering the seat member and a second portion covering the seatback.

According to yet another aspect of the present invention, a seat assembly includes a seat member supported on a frame assembly. The seat member includes a carrier member having a body portion comprised of a closed-cell material. A plurality of drainage apertures are disposed through the body portion. A support layer is supported on an upper surface of the carrier member and includes a body portion comprised of a perforated closed-cell material. A cover member removeably covers the support layer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
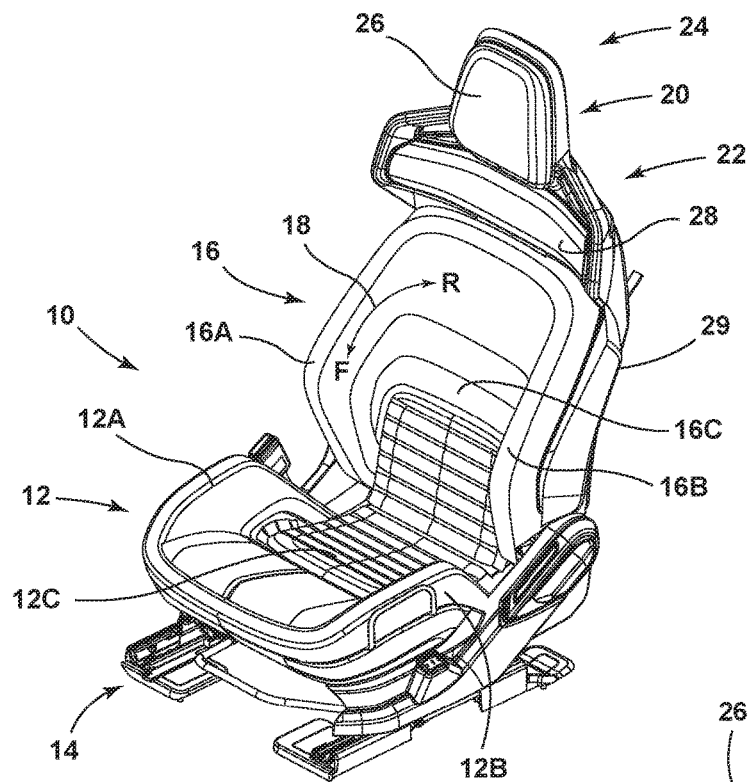
FIG. 1 is a front top perspective view of a vehicle seat assembly according to an embodiment of the present concept.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally indicates a vehicle seat assembly. The seat assembly 10 shown in FIG. 1 is a highly contoured and stylized seat assembly that is configured for use in an off-road vehicle, however, the present disclosure is not limited to such use. The seat assembly 10 generally includes a seat member 12 which may be supported on a track system 14 for linear movement between fore and aft positions within a vehicle cabin. The seat assembly 10 further includes a seatback 16 which is contemplated to be pivotally coupled to the seat member 12. The seatback 16 is contemplated to pivot between various positions along the path as indicated by arrow 18 between a full forward position F and a reclined position R. In the embodiment shown in FIG. 1, the seatback 16 is generally shown in an upright use position for properly supporting a seat occupant. The seat assembly 10 further includes a headrest assembly 20 having a base portion 22 and a support portion 24. The support portion 24 includes a cushioned headrest bun 26 for supporting the head of a seat occupant. The base portion 22 of the headrest assembly 20 further includes a thoracic support cushion 28 disposed on a front portion thereof. The headrest assembly 20 is designed to provide a robust support system for the head of a seat occupant as desired for use in an off-road vehicle where a seat occupant may be subjected to more intense lateral forces as compared to forces experienced in a regular vehicle travel on normal road conditions. As further shown in FIG. 1, the seat assembly 10 includes a back portion 29 of the seatback 16.

To provide the enhanced support features desired in an off-road vehicle, the seat assembly 10 includes the robust headrest assembly 20 having a forwardly curved base portion 22 that has a width commensurate with a width of the seatback 16. The seatback 16 also includes first and second side bolsters 16A, 16B disposed on opposite sides of an inset central support portion 16C. The seat member 12 similarly includes first and second side bolsters 12A, 12B which outwardly extend from a generally inset central support portion 12C. With the first and second side bolsters 16A, 16B of the seatback 16 and the first and second side bolsters 12A, 12B of the seat member 12, the central support portions 12C, 16C of the seat member 12 and seatback 16, respectively, generally define a bucket seat configuration for the vehicle seat assembly 10 wherein a seat occupant is cradled as seated and supported therein. The first and second side bolsters 12A, 12B of the seat member 12, are inwardly angled towards the inset central support portion 12C. Likewise, the first and second side bolsters 16A, 16B of the seatback 16, are inwardly angled towards the inset central support portion 16C. Thus, the configuration of the first and second side bolsters 16A, 16B of the seatback 16 and the first and second side bolsters 12A, 12B of the seat member 12 help to properly position a seat occupant within the seat assembly 10 and also help with drainage, as further described below.

Figure 2:
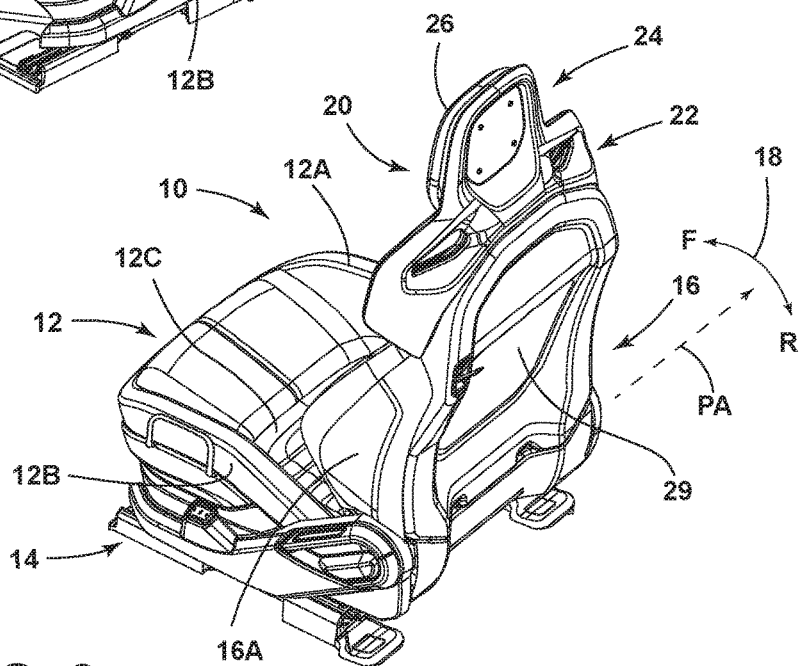
FIG. 2 is a rear top perspective view of the vehicle seat assembly of FIG. 1.

Referring now to FIG. 2, the seat assembly 10 is shown from a rear perspective view, wherein a pivot access PA is indicated for movement of the seatback 16 relative to the seat member 12. As noted above, the seatback 16 is configured for movement between forward and rear positions F, R along the path as indicated by arrow 18. In the embodiment of FIG. 2, the seatback 16 is shown in an upright use position for supporting a seat occupant. From the rear view, the back portion 29 of the seatback is shown.

As used in an off-road vehicle, the seat assembly 10 of the present concept provides enhanced use features that aid in the maintenance and upkeep of the seat assembly 10, as well as prolong the useful life of the seat assembly 10. Specifically, a seat assembly used in an off-road vehicle is generally subjected to environmental conditions that are a product of the environment in which an off-road vehicle may be used. For instance, an off-road vehicle may be used on dirt roads, muddy trails, flooded pathways, and other such driving conditions that include direct contact with terrain that is unpaved or otherwise unfinished. A seat assembly in such an off-road vehicle is exposed to debris and moisture as a driver or passenger(s) enters and exits the off-road vehicle in such conditions. Further, an off-road vehicle may include a convertible top, or other such arrangement, wherein driving the off-road vehicle exposes a seat assembly disposed therein to dirt, mud, water and other environmental conditions. For these reasons, the seat assembly 10 of the present concept is comprised of materials engineered to combat the effects of the elements the seat assembly 10 will encounter as used in an off-road vehicle.

Figure 3:
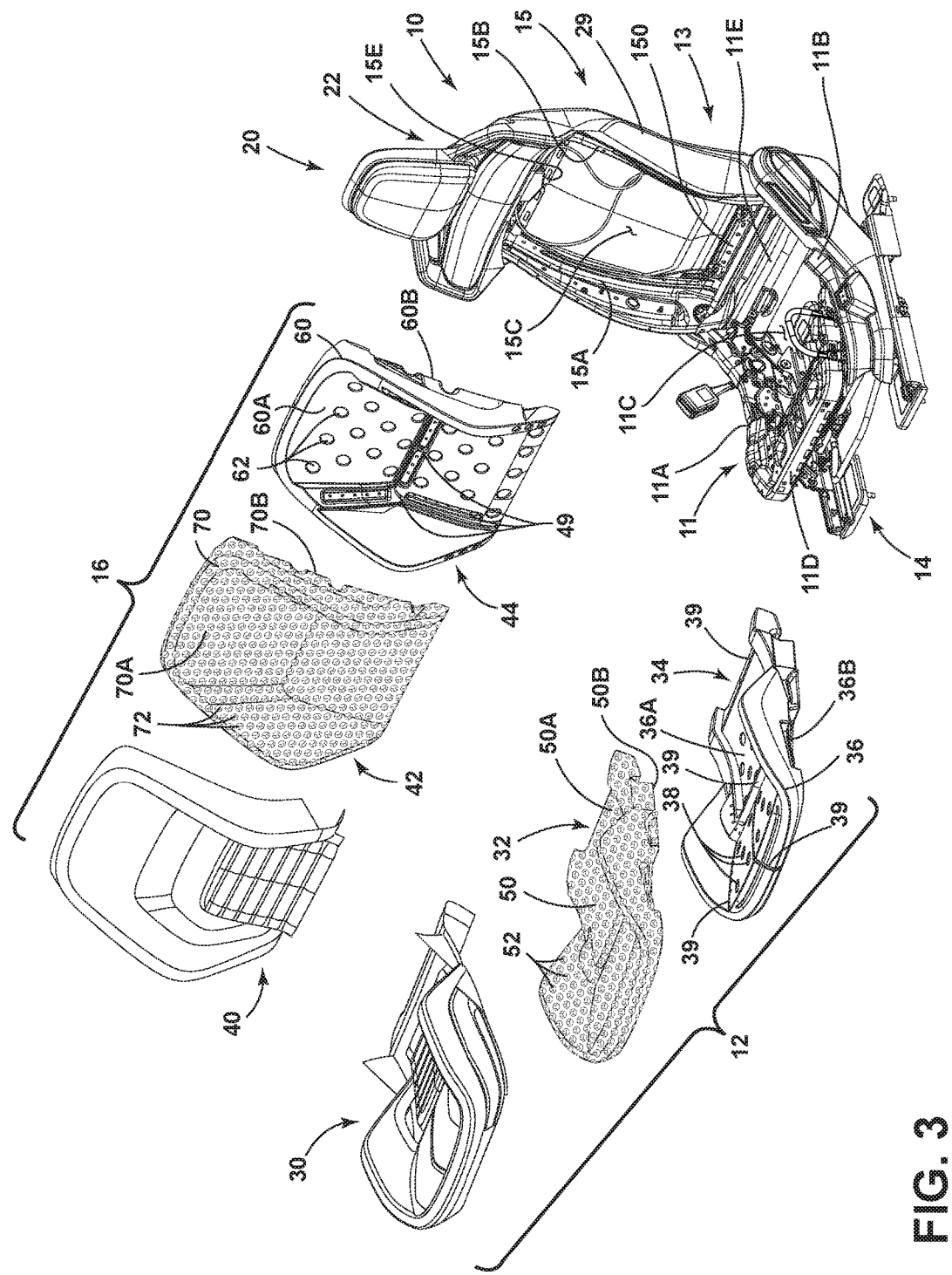
FIG. 3 is a top perspective view of the vehicle seat assembly of FIG. 1 with components of a seat member and a seatback exploded away therefrom.

Referring now to FIG. 3, the seat assembly 10 is shown with component parts of the seat member 12 and seatback 16 shown exploded away from a frame assembly 13. The frame assembly 13 includes a seat portion 11 and a seatback portion 15. The seat portion 11 of the frame assembly 13 includes first and second side frame members 11A, 11B that are interconnected by front and rear frame members 11D, 11E to surround and define a receiving area 11C wherein the seat member 12 is received in assembly. Similarly, the seatback portion 15 of the frame assembly 13 includes first and second side frame members 15A, 15B that are interconnected by front and rear frame members 15D, 15E to surround and define a receiving area 15C wherein the seatback 16 is received in assembly.

With further reference to FIG. 3, the component parts of the seat member 12 are shown separated and exploded away from the frame assembly 13. Specifically, a carrier member 34 is shown having a body portion 36 with upper and lower sides 36A, 36B that are interconnected by a plurality of drainage apertures 38. Thus, the drainage apertures 38 are disposed through the body portion 36, such that the drainage apertures 38 are configured to drain water through the carrier member 34. By interconnecting the upper and lower sides 36A, 36B of the body portion 36 of the carrier member 34, the drainage apertures 38 provide direct drainage through the carrier member 34. Further, the body portion 36 of the carrier member 34 is contemplated to be comprised of a perforated polymeric material that is water resistant. Such a polymeric material may include an expanded polypropylene (EPP) material that is porous and non-absorbent, such that the carrier member 34 is configured to drain water and moisture through the entire body portion 36, and not just through the drainage apertures 38. The size of the drainage apertures 38 are configured to allow for increased drainage as compared to water draining through the porous body portion 36 alone. In this way, the drainage apertures 38 provide for minimized drying times for the seat assembly 10 when the seat assembly 10 is exposed to moisture.

As noted above, the carrier member 34 is contemplated to be comprised of an EPP material, such as an EPP foam. EPP foam is substantially rigid closed-cell foam material that may be a rubbery material that is lightweight, yet very durable. EPP foam is porous in that EPP foam can be comprised of cylinder-shaped polypropylene beads, which add air space between the beads in the final molded form of the carrier member 34. Being a closed-cell material, EPP foam is non-absorbent as compared to highly absorbent polyurethane foams often found in standard seat assemblies. As used herein, the terms "porous" and "perforated" are used to describe materials that are water permeable, but not absorbent. Thus, the water resistant and non-absorbent nature of the carrier member 34 allows for water to move through the body portion 36 of the carrier member 34 through the spaces provided in the perforated (or porous) material of which the body portion 36 is comprised, as well as through the open drainage apertures 38 disposed therethrough.

As further shown in FIG. 3, a support portion 32 is shown having a body portion 50 with upper and lower sides 50A, 50B that are interconnected by a plurality of drainage apertures 52. Thus, the drainage apertures 52 are disposed through the body portion 50, such that the drainage apertures 52 are configured to drain water through the support portion 32. By interconnecting the upper and lower sides 50A, 50B of the body portion 50 of the support portion 32, the drainage apertures 52 provide direct drainage through the support portion 32 towards the carrier member 34. As further described below with reference to FIGS. 4 and 5, the support portion 32 is configured to be supported on the upper side 36A of the carrier member 34 in assembly. Further, the body portion 50 of the support portion 32 is contemplated to be comprised of a perforated polymeric material that is water resistant. Such a polymeric material may include an ethylene-vinyl acetate (EVA) material that is porous and non-absorbent, such that the support portion 32 is configured to drain water and moisture through the entire body portion 50, and not just through the drainage apertures 52. Like the carrier member 34 described above, the size of the drainage apertures 52 of the support portion 32 are configured to allow for increased drainage as compared to water draining through the porous body portion 50 of the support portion 32 alone. In this way, the drainage apertures 52 provide for minimized drying times for the seat assembly 10 when the seat assembly 10 is exposed to moisture.

As noted above, the support portion 32 is contemplated to be comprised of an EVA material, such as an EVA foam. EVA foam is a flexibly resilient closed-cell foam material that may be highly elastic, lightweight, yet very durable. EVA foam beads can be sintered into a porous structure. Being a closed-cell material, EVA foam is non-absorbent as compared to highly absorbent polyurethane foams often found in standard seat assemblies. Thus, the water resistant and non-absorbent nature of the support portion 32 defines a support layer positioned above the carrier member 34 in assembly that allows for water to move through the body portion 50 of the support portion 32 through the spaces provided in the perforated (or porous) material of which the body portion 50 of the support portion 32 is comprised. Further, as noted above, not only is the body portion 50 of the support portion 32 a porous member that allows for drainage therethrough, the open drainage apertures 52 disposed through the body portion 50 allow for rapid drainage from the support portion 32 to the carrier member 34 upon which the support portion 32 is positioned in assembly. As further shown in FIG. 3, the body portion 50 of the support portion 32 may be configured in a honeycomb configuration, wherein the drainage apertures 52 define pass-through apertures through the honeycomb design of the body portion 50 of the support portion 32.

Figure 4:
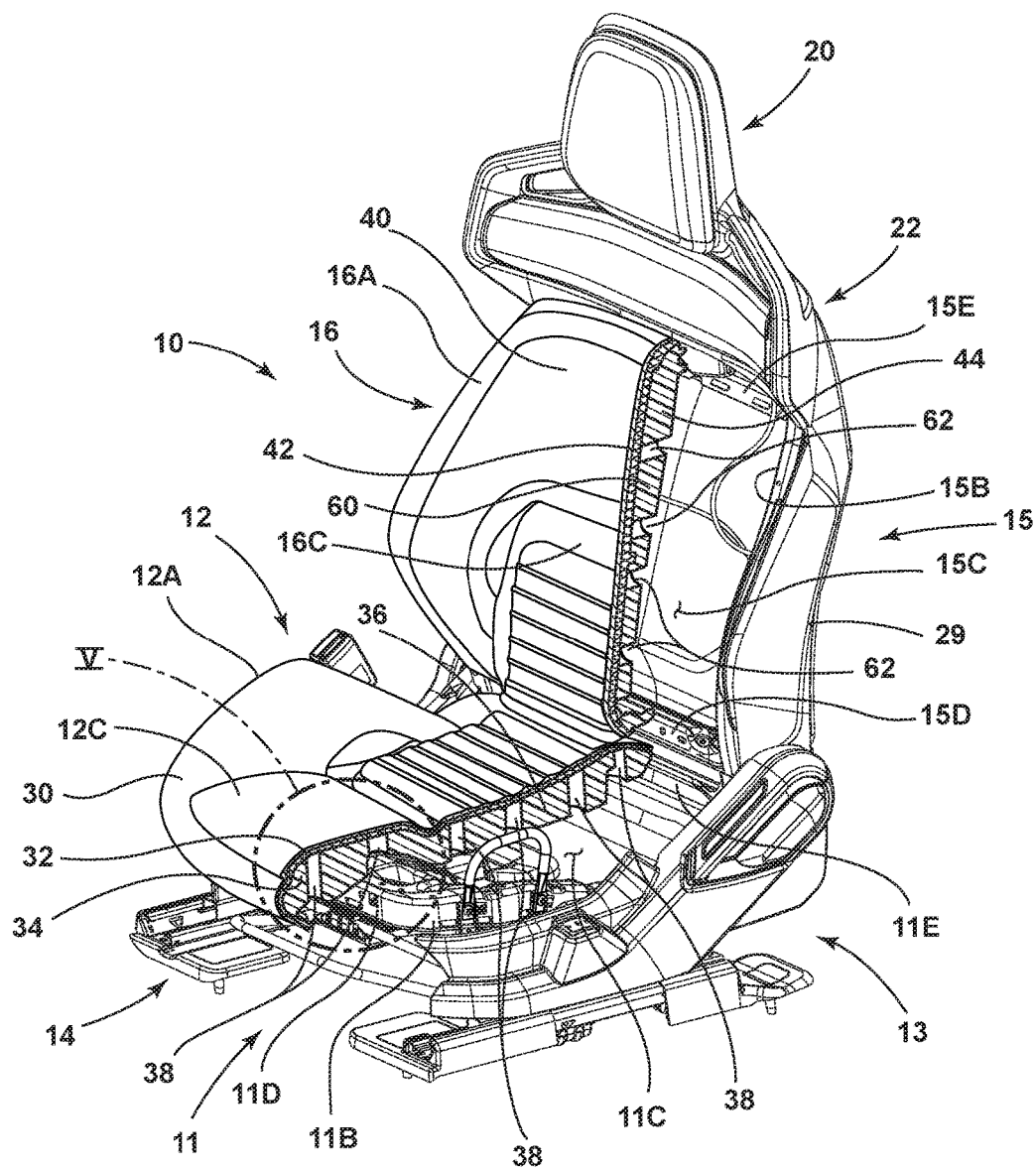
FIG. 4 is a partial cross-sectional view of the vehicle seat assembly of FIG. 1.
Figure 5:
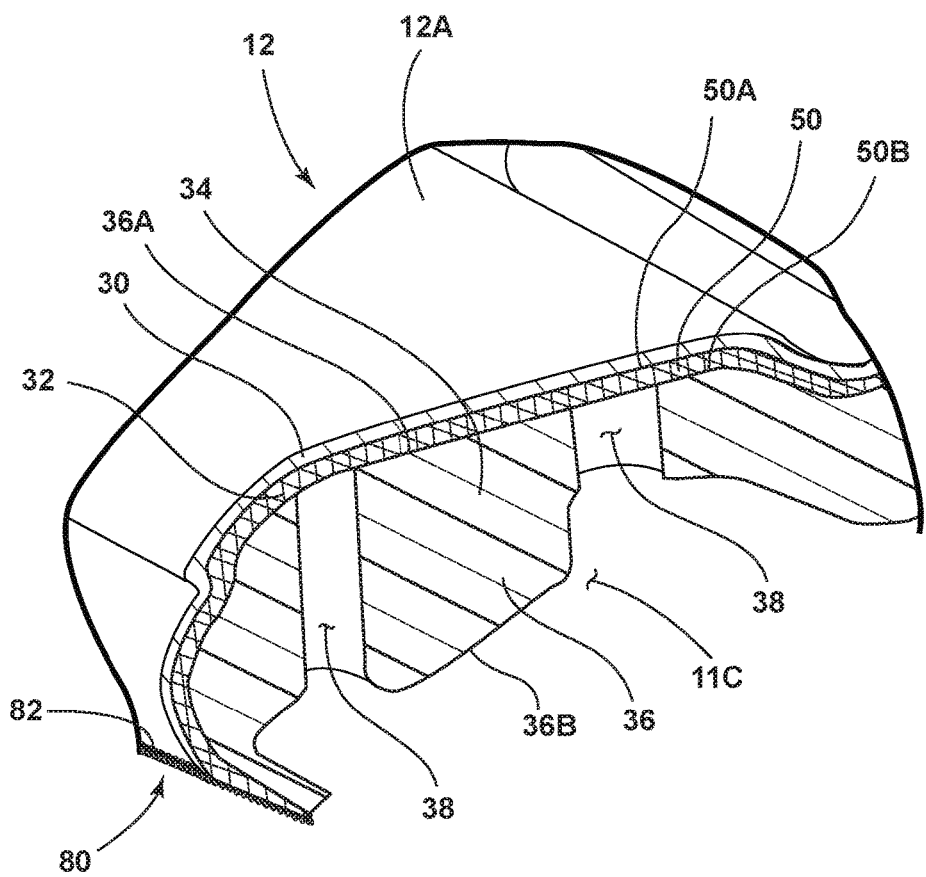
FIG. 5 is a close up view of the vehicle seat assembly of FIG. 4 taken at location V.

As further shown in FIG. 3, a cover member 30 is configured to be disposed over the upper surface 50A of the support portion 32 in assembly. This configuration is best shown in FIGS. 4 and 5. The cover member 30 is contemplated to be comprised of a perforated fabric that is non-absorbent. Thus, the component parts of the seat member 12 (the support portion 32, the carrier member 34, and the cover member 30) are all porous parts which are water resistant or non-absorbent. Thus, when the seat assembly of the present concept is exposed to moisture, the moisture will not be absorbed by any of the component parts of the seat member 12, and will bead up and drain through the porous cover member 30 to the porous support portion 32 to the porous carrier member 34 and out of the seat assembly 10. As noted above, drainage through the respective body portions 36, 40 of the support portion 32 and the carrier member 34 will be expedited through the respective drainage apertures 38, 52 of the support portion 32 and the carrier member 34. The cover member 30 may include an antimicrobial coating to protect a vehicle occupant from infectious diseases spread by pathogens that are readily found in moisture rich and soiled environments. Further, the antimicrobial coating can help protect against the development of mold or mildew on a wet and soiled seat assembly. The antimicrobial coating may include a metal derivative, such as a hydroxide, an oxide, or a peroxide of a metal that is included in the coating to provide antimicrobial features to the cover member 30 to protect against pathogens. Such metals may include zinc, magnesium, titanium, zirconium, and other metals known in the art.

With further reference to FIG. 3, the component parts of the seatback 16 are also shown separated and exploded away from the frame assembly 13. Like the seat member 12, the seatback 16 includes a carrier member 44, a support portion 42, and a cover member 40. The carrier member 44 is shown having a body portion 60 with upper and lower sides 60A, 60B that are interconnected by a plurality of drainage apertures 62. Thus, the drainage apertures 62 are disposed through the body portion 60, such that the drainage apertures 62 are configured to drain water through the carrier member 44. By interconnecting the upper and lower sides 60A, 60B of the body portion 60 of the carrier member 44, the drainage apertures 62 provide direct drainage through the carrier member 44. Further, the body portion 60 of the carrier member 44, much like the body portion 36 of the carrier member 34 of the seat member 12, is contemplated to be comprised of a perforated polymeric material that is water resistant. Such a polymeric material may include an expanded polypropylene (EPP) material that is porous and non-absorbent, such that the carrier member 44 is configured to drain water and moisture through the entire body portion 60, and not just through the drainage apertures 62. The size of the drainage apertures 62 are configured to allow for increased drainage as compared to water draining through the porous body portion 60 alone. In this way, the drainage apertures 62 provide for minimized drying times for the seat assembly 10 when the seat assembly 10 is exposed to moisture.

As further shown in FIG. 3, a support portion 42 of the seatback 16 is shown having a body portion 70 with upper and lower sides 70A, 70B that are interconnected by a plurality of drainage apertures 72. Thus, the drainage apertures 72 are disposed through the body portion 70, such that the drainage apertures 72 are configured to drain water through the support portion 42. By interconnecting the upper and lower sides 70A, 70B of the body portion 70 of the support portion 42, the drainage apertures 72 provide direct drainage through the support portion 42 towards the carrier member 44. As further described below with reference to FIGS. 4 and 5, the support portion 42 is configured to be supported on the upper side 60A of the carrier member 44 of the seatback 16 in assembly. Further, the body portion 70 of the support portion 42 is contemplated to be comprised of a perforated polymeric material that is water resistant. Such a polymeric material may include an ethylene-vinyl acetate (EVA) material that is porous and non-absorbent, such that the support portion 42 is configured to drain water and moisture through the entire body portion 70, and not just through the drainage apertures 72. Like the carrier member 44 of the seat back 16 described above, the size of the drainage apertures 72 of the support portion 42 are configured to allow for increased drainage as compared to water draining through the porous body portion 70 of the support portion 42 alone. In this way, the drainage apertures 72 provide for minimized drying times for the seat assembly 10 when the seat assembly 10 is exposed to moisture.

As noted above, the support portion 42 is contemplated to be comprised of an EVA material, such as an EVA foam that is flexibly resilient and comprised of closed-cell structures, such that the foam is non-absorbent as compared to highly absorbent polyurethane foams often found in standard seat assemblies. Thus, the water resistant and non-absorbent nature of the support portion 42 defines a support layer positioned above the carrier member 44 in assembly that allows for water to move through the body portion 70 of the support portion 42 through the spaces provided in the perforated (or porous) material of which the body portion 70 of the support portion 42 is comprised. Further, as noted above, not only is the body portion 70 of the support portion 42 a porous member that allows for drainage therethrough, the open drainage apertures 72 disposed through the body portion 70 allow for rapid drainage from the support portion 42 to the carrier member 44 upon which the support portion 42 is positioned in assembly. As further shown in FIG. 3, the body portion 70 of the support portion 42 may be configured in a honeycomb configuration, wherein the drainage apertures 72 define pass-through apertures through the honeycomb design of the body portion 70 of the support portion 42.

As further shown in FIG. 3, a cover member 40 is configured to be disposed over the upper surface 70A of the support portion 42 in assembly. This configuration is best shown in FIGS. 4 and 5. The cover member 40, much like cover member 30 of the seat member 12, is contemplated to be comprised of a perforated fabric that is non-absorbent. Thus, the component parts of the seatback 12 (the support portion 42, the carrier member 44, and the cover member 40) are all porous parts which are water resistant or non-absorbent. Thus, when the seat assembly of the present concept is exposed to moisture, the moisture will not be absorbed by any of the component parts of the seatback 16, and will bead up and drain through the porous cover member 40 to the porous support portion 42 to the porous carrier member 44 and out of the seat assembly 10. The cover member 40 may also include an antimicrobial coating to protect a vehicle occupant from infectious diseases spread by pathogens that are readily found in moisture rich and soiled environments. Both the cover members 30 and 40 of the seat member 12 and seatback 16 are form fitting cover members which may be removable for easy cleaning, as further described below.

It is contemplated that the carrier members 34, 44 and the respective support portions 32, 42 may include different hardness levels. Specifically, the carrier member 34 and the support portion 32 of the seat member 12 may include respective first and second hardness values, wherein the first hardness value of the carrier member 34 is greater than the second hardness value of the support layer 32. Similarly, the carrier member 44 and the support portion 42 of the seatback 16 may include respective first and second hardness values, wherein the first hardness value of the carrier member 44 is greater than the second hardness value of the support portion 42. Thus, the composite materials of the carrier members 34, 44 and the respective support portions 32, 42 may include different hardness levels, such that the carrier members 34, 44 provide more rigid support, while the support portions 32, 42 provide cushioned comfort support for a seat occupant at a lower hardness level as compared to the carrier members 34, 44. Further, the carrier members 34, 44 may provide a cost savings for overall assemblies of the seat member 12 and the seatback 16 by using the materials noted above that are less expensive than the materials identified for the composition of the support portions 32, 42.

Referring now to FIGS. 4 and 5, portions of the seat assembly 10 are shown in a partial cross-sectional view to show the relationship between the component parts of the seat member 12 and the seatback 16. With specific reference to FIG. 4, the seatback 16 is shown having the carrier member 44 positioned on the seatback portion 15 of the frame assembly 13. The support portion 42 is shown positioned on the upper surface or upper side 60A of the carrier member 44. The drainage apertures 62 are shown spaced along the body portion 60 of the carrier member 44 interconnecting the support portion 42 and the receiving area 15C of the frame assembly 13. As further shown in FIG. 4, the cover member 40 is shown disposed on the upper side 70A of the support portion 42 to fully cover the same in assembly.

With further reference to FIG. 4, the seat member 12 is shown having the carrier member 34 positioned on the seat portion 11 of the frame assembly 13. As best shown in FIG. 5, the support portion 32 is positioned on the upper surface 36A of the carrier member 34. The drainage apertures 38 are shown disposed through the body portion 36 of the carrier member 34, thereby interconnecting the support portion 32 and the receiving area 11C of the frame assembly 13. As further shown in FIG. 5, the cover member 30 is shown disposed on the upper side 50A of the support portion 32 to fully cover the same in assembly.

As further shown in FIG. 5, a coupling mechanism 80 includes a first portion 82 disposed on the cover member 30. In use, the coupling mechanism 80 is configured to couple the cover member 30 the seat assembly 10 in a releasable manner, such that the cover member 32 can be removed from the seat assembly 10 to be cleaned. A similar coupling mechanism is contemplated for use in removably coupling cover member 40 of the seatback 16 to the seat assembly 10. It is contemplated that the coupling mechanism 80 may include a second portion that engages the first portion 82 to selectively couple the cover member 30 to the seat assembly 10. The second portion may be located on any portion of the seat assembly 10, such as the frame assembly 13 and/or the carrier members 34, 44.

Figure 6:
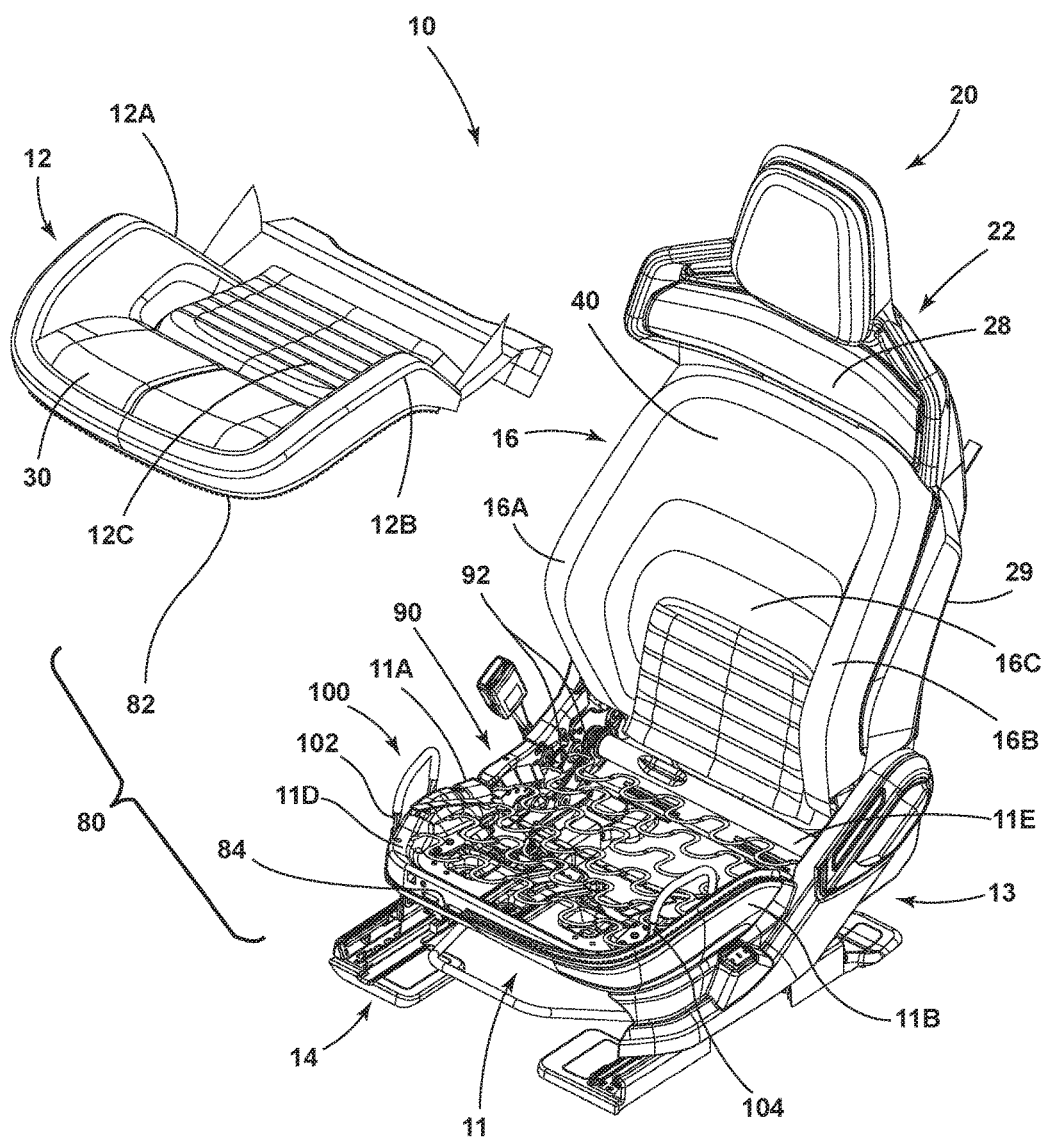
FIG. 6 is a top perspective view of the vehicle seat assembly of FIG. 1, with a removable seat cover exploded away therefrom.

Referring now to FIG. 6, the seat member 12 is shown removed from the seat assembly 10 to reveal a suspension assembly 90. In FIG. 6, first and second portions 82, 84 of the coupling mechanism 80 are shown, where and second portion 84 is disposed on the seat portion 11 of the frame assembly 13 for coupling the cover member 30 thereto in a releasable manner. The first and second portions 82, 84 of the coupling mechanism 80 are operably between engaged and disengaged conditions to selectively couple the cover member 30 to the seat assembly 10. Cover member 40 may also include a coupling mechanism, much like coupling mechanism 80, to selectively secure the same to the seat assembly 10. In use, it is contemplated that the entire seat member 12 will not be removed with the cover member 30 via the release of the first and second portions 82, 84 of coupling mechanism 80, but rather the cover member 30 alone will be removable via the coupling mechanism 84 cleaning.

As further shown in FIG. 6, the suspension assembly 90 includes support wires 92 that are flexibly resilient members that allow for vertical travel as a suspension feature for the seat assembly 10. Further, it is contemplated that the carrier member 34, 44 of the seat assembly 10 can be used in replacement of the suspension assembly 90 shown in FIG. 6. As such, is contemplated that the carrier members 34, 44 of the seat assembly 10, being comprised of an EPP material can function as a suspension mechanism providing vertical travel for a vehicle occupant in a resilient manner given the configuration of the carrier members 34, 44 shown in FIG. 3, without the need for a suspension system as illustrated in FIG. 3. A reinforcement member 100 having first and second sides 102, 104 may be used to provide reinforcement for the carrier member 34 at the underside 36B thereof. The reinforcement member 100 is configured to couple to the frame assembly 13 at the seat portion 11 at side frame members 11A, 11B. it is contemplated that the carrier member 34 and the carrier member 44 may be formed with a plurality of thinned portions 39, 49 respectively that provide for enhanced travel for the carrier members 34, 44 to act as self-suspending members in assembly. As self-suspending members, the carrier members 34, 44, of the present concept may obviate the need for metal suspension parts, such as seat pans and support wires like support wires 92, which are susceptible to corrosion when exposed to moisture.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat assembly, comprising:
   a frame assembly have a seat portion and a seatback portion;
   a seat member supported on the seat portion of the frame assembly and having a support portion supported on a carrier member, wherein the support portion and the carrier member of the seat member are comprised of porous non-absorbent materials that are configured to allow water to drain therethrough;
   a seatback supported on the seatback portion of the frame assembly and having a support portion supported on a carrier member, wherein the support portion and the carrier member of the seatback are comprised of porous non-absorbent materials that are configured to allow water to drain therethrough; and
   a cover member comprised of a perforated fabric that is non-absorbent, wherein the cover member includes a first portion covering the seat member and a second portion covering the seatback.

2. The seat assembly of claim 1, wherein the porous non-absorbent material of the carrier member of the seat member is comprised of an expanded polypropylene material.

3. The seat assembly of claim 2, wherein the porous non-absorbent material of the carrier member of the seatback is comprised of an expanded polypropylene material.

4. The seat assembly of claim 1, wherein the porous non-absorbent material of the support portion of the seat member is comprised of an ethylene-vinyl acetate material.

5. The seat assembly of claim 4, wherein the porous non-absorbent material of the support portion of the seatback is comprised of an ethylene-vinyl acetate material.

6. The seat assembly of claim 1, wherein the porous non-absorbent materials of the carrier member of the seat member and the seatback are substantially rigid.

7. The seat assembly of claim 6, wherein the porous non-absorbent materials of the support portion of the seat member and the seatback are flexibly resilient and configured in a honeycomb configuration having a plurality of pass-through apertures disposed through body portions thereof.

8. A seat assembly, comprising:
   a seat member supported on a frame assembly, the seat member comprising:
     a carrier member having a body portion comprised of a closed-cell material;
     a plurality of drainage apertures disposed through the body portion;
     a support layer supported on an upper surface of the carrier member and having a body portion comprised of a perforated closed-cell material, wherein the carrier member and the support layer include respective first and second hardness values, and further wherein the first hardness value of the carrier member is greater than the second hardness value of the support layer; and
     a cover member removeably covering the support layer.

9. The seat member of claim 8, wherein the cover member is comprised of a non-absorbent fabric material having an antibacterial coating.

10. The seat assembly of claim 8, including:
a coupling mechanism having a first portion disposed on the cover member, and a second portion disposed on one of the support layer, the frame assembly, and the carrier member, wherein the first and second portions of the coupling mechanism are operably between engaged and disengaged conditions relative to one another to removeably couple the cover member to the seat assembly.

11. The seat assembly of claim 8, wherein the closed-cell material of the carrier member of the seat member is comprised of an expanded polypropylene foam material.

12. The seat assembly of claim 11, wherein the closed-cell material of the support layer of the seat member is comprised of an ethylene-vinyl acetate foam material.

\* \* \* \* \*